United States Patent [19]
Zhuo et al.

[11] Patent Number: 6,162,849
[45] Date of Patent: Dec. 19, 2000

[54] THERMALLY CONDUCTIVE THERMOPLASTIC

[75] Inventors: Qizhuo Zhuo, Vista, Calif.; Ronald M. Harris, North Royalton, Ohio; Dennis C. Skovran, Niles, Ohio; Leo F. Lightner, Rocky River, Ohio; Michael S. Randall, Leucidia; Vernon E. Stygar, San Diego, both of Calif.

[73] Assignee: Ferro Corporation, Cleveland, Ohio

[21] Appl. No.: 09/228,265

[22] Filed: Jan. 11, 1999

[51] Int. Cl.[7] .............................. C08K 3/38; C08L 67/06
[52] U.S. Cl. ...................... 524/404; 524/553; 524/592; 524/601; 524/606; 524/611
[58] Field of Search ...................... 524/404, 553, 524/592, 601, 606, 609, 611

[56] References Cited

U.S. PATENT DOCUMENTS

| | | | |
|---|---|---|---|
| 3,261,800 | 7/1966 | Collins | 260/37 |
| 5,011,872 | 4/1991 | Latham et al. | 523/440 |
| 5,017,304 | 5/1991 | Hijikata | 252/299.01 |
| 5,057,903 | 10/1991 | Olla | 357/72 |
| 5,110,861 | 5/1992 | Togami et al. | 524/601 |
| 5,194,480 | 3/1993 | Block et al. | 524/404 |
| 5,232,970 | 8/1993 | Solc et al. | 524/404 |
| 5,268,414 | 12/1993 | Nakai et al. | 524/539 |
| 5,371,134 | 12/1994 | Inoue | 524/495 |
| 5,514,739 | 5/1996 | Aketa et al. | 524/108 |
| 5,523,049 | 6/1996 | Terpstra et al. | 419/36 |
| 5,660,917 | 8/1997 | Fujimori et al. | 428/195 |
| 5,681,883 | 10/1997 | Hill et al. | 524/404 |
| 5,766,507 | 6/1998 | Nakai | 252/299.01 |
| 5,781,412 | 7/1998 | de Sorgo | 361/704 |
| 5,844,036 | 12/1998 | Hughes | 524/494 |
| 6,048,919 | 4/2000 | McCullough | 524/404 |

FOREIGN PATENT DOCUMENTS 1169855  11/1969  United Kingdom.

OTHER PUBLICATIONS

McGraw–Hill Modern Polastics Encyclopedia (1968 ed), vol. 45, Sep. 1967.
Polymer Handbook. 4th Edition, New York, John Wiley and Sons, Inc., 1999.
Bigg, "Thermally Conductive Polymer Compositions," Polymer Composites, Jun. 1986, vol. 7, No. 3, pp. 125–138.
Mesloh, "Thermal Conductivity Of Filled Plastics," pp. 1–13, 1986.

*Primary Examiner*—Vasu Jagannathan
*Assistant Examiner*—Katarzyna Wyrozebski
*Attorney, Agent, or Firm*—Rankin, Hill, Porter & Clark LLP

[57] ABSTRACT

This invention relates to a thermally conductive moldable polymer blend comprising a thermoplastic polymer having a tensile at yield of at least 10,000 psi; at least 60% by weight of a mixture of boron nitride powders having an average particle size of at least 50 microns; and a coupling agent. The composition displays a thermal conductivity of at least about 15 W/m° K and it is capable of being molded using high speed molding techniques such as injection molding.

14 Claims, No Drawings

THERMALLY CONDUCTIVE THERMOPLASTIC

TECHNICAL FIELD OF THE INVENTION

This invention relates to a thermoplastic composition. More particularly, the invention concerns a moldable thermoplastic that displays excellent heat conducting properties.

BACKGROUND OF THE INVENTION

The dramatic increase in circuit density in the microcircuitry of today's electronic devices has lead to problems relating to the dissipation of heat generated in such devices. Elimination of heat from these devices is critical for it is well-known that the reliability of today's microcircuits is directly affected by the ability to dissipate the heat generated. Various devices or heat sinks are employed in today's electronic devices to assist in the dissipation of heat. Many of these heat sinks possess complex configurations in order to increase the surface area of the device and thus the heat dissipation characteristics of the device. Various attempts to assist in the dissipation of heat have been made using heat sinks formed of polymer filled material systems. Examples of such prior art material systems may be found for example in U.S. Pat. Nos. 3,908,040 and 4,265,775. Although some of these prior art polymer systems display good thermal conductivity, they are not conducive for use in molding heat sinks or other devices of complex configuration.

The present invention provides a polymer material system that in addition to displaying excellent thermal conductivity also displays excellent molding characteristics. Thus, the polymer material system of the present invention may be used to mold heat sink devices of complex configuration.

SUMMARY OF INVENTION

The present invention provides a cost-effective moldable thermoplastic polymer system that displays excellent thermal conductivity. The system can be melt processed and solidified by cooling without curing as needed for thermoset polymer composites. The system of the present invention also displays good mechanical properties and it can be processed in high-speed, high-volume processing equipment such as injection molding equipment. The polymer system of the present invention displays a thermal conductivity of at least 15 W/m° K. In addition to displaying good thermal conductivity, the polymer system displays a low coefficient linear thermal expansion, less than about 11 ppm/° C. Additionally, parts molded with the polymer system display a volume resistivity of at least about $1 \times 10^{16}$ Ohm cm. In many applications, a material with high resistance is required. Of course, it will be appreciated that if the application so requires, the composition can be easily rendered electrically conductive by adding conductive materials such as copper, silver or gold.

In a preferred embodiment the polymer system of the present invention comprises a base thermoplastic polymer having a tensile at yield of at least 10,000 psi, at least 60% by weight boron nitride particles having an average particle size of at least about 50 microns, the polymer system displaying a thermal conductivity of at least 15 W/m° K. The thermoplastic resin utilized in the system displays either a $T_g$ of at least 100° C. or a $T_m$ of at least 250 20 C.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DESCRIPTION OF THE PREFERRED EMBODIMENTS

This invention relates generally to an injection moldable thermally conductive thermoplastic composite composition or blend useful where heat dissipation is required, e.g., heat sinks, electronic device packaging, bearing applications, etc.

A major drive for development in the electronic industry is to produce components that are lower in cost, lighter in weight and smaller in size while having ever increasing performance characteristics. As a result, more heat per unit area is typically generated in these devices. High-speed chips used in today's advanced systems require appropriate heat removal to ensure optimal system performance. Thus, the need to develop low cost thermal management solutions for effective heat dissipation has increased.

The ability of a thermal management material to dissipate heat is determined by its thermal conductivity. Thermal conductivity (K) is one of the basic thermophysical properties which determines the heat flux and the resulting temperature field in a device configuration, subject to boundary conditions. Thermal conductivity (K) in W/m° K is defined as:

$$K = 100 \times \alpha \times \rho \times Cp$$

where: $\alpha$ is the thermal diffusivity (cm²/s), $\rho$ is the density (g/cm³), Cp is the heat capacity (J/g° K).

Thermoplastic polymers are light weight materials having good mechanical and electrical insulating properties. They can be easily processed into various forms using low cost, automated, high-speed processing techniques such as injection molding. Unfortunately, polymers, as a class of materials, have low thermal conductivity (typically in the range of 0.2–0.4 W/m° K). By adding high K fillers such as metal powder, carbon fiber or select ceramics to the polymer matrix, a substantial increase in thermal conductivity can be realized under heavy filler loading. However, high filler loading can result in an extremely high melt viscosity, making the composite difficult to melt process via injection molding. In the past, this has generally limited the thermal conducting capability of thermoplastic composites to below about 10 W/m° K (typically in the range of 2 to 5 W/m° K). A recent break-through utilizing high thermal conductivity carbon fibers has allowed an increase in K of injection moldable polymer composites up to 17–20 W/m° K. Unfortunately, carbon fiber based polymer composite materials give inconsistent results due to the fact that carbon fibers often break down under high shear condition and it is also difficult to control the orientation of carbon fiber in high speed molding applications. In addition, the inherent electrical conductivity of carbon fiber, combined with the high cost of this material have also limited its application. Consequently, there is a continuing interest in developing low cost polymer composites with good processability, high thermal conductivity, low coefficient of thermal expansion, good electric insulative property and high mechanical strength.

It is, therefore, an objective of the present invention to provide thermoplastic molding compositions which offer the capability to use the high volume, low cost molding processes such as injection molding, combined with high thermal conductivity, a low coefficient thermal expansion, light weight and good electrical insulative properties (when required).

In accordance with the present invention, it has been discovered that thermally conductive thermoplastic polymer compositions may be prepared by mixing a polymer matrix or base resin, a de-agglomerated boron nitride powder or a mixture of the de-agglomerated boron nitride powder and a coupling or dispersing agent to achieve a product with a thermal conductivity of above about 15 W/m° K, and a coefficient of thermal expansion (CTE) of below about 15 ppm/° C., and good electrical insulative properties with volume resistivity of at least $10^{16}$ Ohms cm. Preferably, the composition displays a thermal conductivity of at least about 18 W/m° K, and more preferably, a conductivity of at least 20 W/m° K. These new materials can be easily molded into various forms using normal injection molding techniques. These new materials provide excellent low cost alternatives to alumina and other packaging materials for a myriad of applications from microprocessor packaging to bearing housings and other heat-exchanger applications such as heat sinks for microprocessors and integrated circuit chips, plastic ball grid array packages, quad flat packs, and other common surface-mounted integrated circuit packages. As new thermoplastic composites of the present invention are electric insulating and exhibit such a high thermal conductivity which is close to that of pure alumina (about 25 W/m° K), they may be used in many microelectronic chip packaging currently dominated by ceramic packaging materials which are heavier, higher cost and more difficult to process. The materials of the present invention may also be injection molded directly into heat sink and heat spreader applications with a variety of compact and complex shapes to provide highly efficient cooling for microprocessors and other heat generating electronic devices.

Unless the context indicates otherwise, throughout the specification and claims, the amount of the polymers present is determined inclusive of fillers, glass or other nonpolymer additives in the polymer compositions. Therefore, the amount of each polymer is determined by dividing the weight of the polymer by the combined weight of all of the components present in the composition.

Base Resin (A)

The polymer system of the present invention includes a base resin (A). Generally, the polymer system comprises from about 15% to about 40% by weight base resin (A). Base resin (A) comprises a thermoplastic that displays a tensile at yield of at least about 10,000 psi. If the thermoplastic comprises a crystalline material, it displays a $T_m$ of at least 250° C. If the thermoplastic comprises an amorphous material, it displays a $T_g$ of at least 100° C. Applicants have found that it is critical to employ a thermoplastic that displays good mechanical strength (a rigid thermoplastic) in order to ensure good thermal conductivity. Also, the applicants believe that it is important that the base resin display an elevated $T_m$ or $T_g$.

Thermoplastic polymers suitable for use in the present invention include thermoplastic liquid crystal polymers and thermoplastic polyesters such as polyethylene naphthalate, polyethylene terephthalate, polybutylene terephthalate. Other engineering thermoplastic polymers may also be employed in the present invention including polyamide, polyphthalamide, polyphenylene sulfide, polycarbonates, polyetheretherketones, polyaryletherketone and polyphenylene oxide. The thermoplastic polymers must have melt processing temperatures in the range of from about 450° F. to 600° F.

The term "liquid-crystal polymer" used in the present invention is intended to mean a melt-processable polymer having such properties that the polymer molecular chains are regularly arranged parallel to each other in a molten state. The state in which molecules are arranged in this way is often called a liquid-crystal state or a nematic phase of a liquid-crystal material. Such polymer molecules are generally slender and flat and have substantial rigidity along the major axis of the molecule and a plurality of chain-lengthening bonds which are usually in either a coaxial relationship or a parallel relationship with each other.

The properties of the anisotropic molten phase may be confirmed by a customary polarimetric method using crossed nicols. More particularly, the anisotropic molten phase can be confirmed by observing a molten sample placed on a Leitz hot stage in a nitrogen atmosphere at a magnification of 400 under a Leitz polarization microscope. When the polymer of the present invention is placed between crossed nicols, it permits transmission of polarized light even in a static state, i.e., exhibits optical anisotropy.

Liquid-crystal polymers suitable for use in the present invention are substantially insoluble in general solvents, which renders the liquid-crystal polymers unsuitable for processing in solution. Instead, these polymers can be easily processed by a usual melt processing method. Preferably, the thermoplastic polymer is dried at about 250° F. for about 8 hours before mixing with other components.

Boron Nitride (B)

The polymer system of the present invention includes a boron nitride filler (B). Examples of thermally conductive boron nitride fillers suitable for use in the present invention include fine particles of boron nitride with hexagonal crystal structure. The polymer system comprises at least 60%, preferably at least 65%, and more preferably at least 70% by weight boron nitride filler. Mixture of such materials may also be utilized. Specifically, for certain applications, preferably, about 10 to 40% by volume of the particles display an average particle size of about 5 to about 25 microns, and about 60 to 90% by volume of the particles display an average particle size of about 40 to about 80 microns. In total, the filler displays an average particle size of at least about 50 microns. The particle morphology of the fillers is also important. Fillers of large and de-agglomerated single crystal powder are preferred over fillers containing the strongly bonded agglomerate. Examples of fillers suitable for the present intention are boron nitride materials sold under the trade designations PolarTherm PT110 (surface area of 0.1–1 $m^2$/gm, particle size of 35–60 microns) and Polar Therm PT120 (surface area of 0.5–5 $m^2$/gm, particle size of 8–14 microns) by Advanced Ceramic of Cleveland, Ohio. Prior to use, the fillers are preferably dried in a forced air oven at about 300° F. for about 6 hours and then kept at 120° F. before mixing with polymers.

Coupling Agent (C)

The polymer system of the present invention includes by weight from about 0.1% to about 5% by weight of a coupling agent (C). The coupling and/or dispersing agent serves to facilitate a better wetting of the boron nitride fillers. It also helps to reduce the melt viscosity of the composition and allows higher loading of the fillers in the composition. In addition, the coupling and dispersion agent may also improve the interface adhesion between polymer and the ceramic fillers and thus provides better physical and mechanical properties. The coupling and/or dispersion agent must have high thermal stability to survive the harsh conditions of common high volume melt processing such as extrusion, compounding and injection molding, which usually operate at temperatures above the melting temperature of the thermoplastic polymer. Any number of conventional coupling agents may be employed in the blends of the present invention. Examples of suitable coupling and dispersion agents include, for example, a neoalkoxy titanate coupling agent sold under the trade designation of Ken-React CAPS L12/L and Ken-React CAPS L38/L, or a monoalkoxy titanate coupling agent sold under the trade designation of Ken-React KR55 or Ken-React CAPOW KR55/H by the Kenrich Petrochemical Company of N.Y. Another suitable example includes the proprietary K-2 dispersion aid available from Pfaumer Brothers Inc. of Norristown, Pa.

Preparation of Polymer Blends

The blended polymer compositions of the present invention can be prepared by techniques well-known to those skilled in the art. For example, a particularly useful procedure is to intimately mix the polymers using conventional melt mixing equipment such as a mill, a Banbury, a Brabender, a single or twin screw extruder, continuous mixers, kneaders, etc. For example, the polymers may be intimately mixed in the form of granules and/or powder in a high shear mixer. One process for preparing the blended polymers utilizes the Farrell Compact Processor, CP-23 and CP-57. Short residence times and high shear are readily obtained in a CP-23 and a CP-57. "Intimate" mixing means that the mixture is prepared with sufficient mechanical shear and thermal energy to produce a dispersed phase which is finely divided and homogeneously dispersed in the continuous or principal phase.

Various features and aspects of the present invention are illustrated further in the examples that follow. While these examples are presented to show one skilled in the art how to operate within the scope of this invention, they are not to serve as a limitation on the scope of the invention where such scope is only defined in the claims.

Unless otherwise indicated in the following examples and elsewhere in the specification and claims, all parts and percentages are by weight, temperatures are in degrees centigrade and pressures are at or near atmospheric.

Example 1—PEN Based Thermally Conductive Thermoplastic System

The following injection moldable composition was prepared using a ZSK30 extruder.

| Component | Sources | % Weight |
| --- | --- | --- |
| Boron nitride powder (PT110) | Advanced Ceramic | 64.0 |
| Boron nitride powder (PT120) | Advanced Ceramic | 6.00 |
| Coupling agent (Ken-React CAPS L12/L) | Kenrich Petrochemical | 1.50 |
| Polyethylene naphthalate | Eastman Chemical | 28.50 |

The polyethylene naphthalate (PEN) was dried in a Novatec drier at 250° F. for about 8 hours. It was then hand mixed with the Ken-React CAPS L12/L. The boron nitride powders were dried in a forced air oven at 300° F. for about 6 hours. The forced air oven was cooled. The boron nitride was then put in autoclave bags and sealed. The sealed boron nitride was then put in the Novatec drying system and kept at about 120° F. until they were used. PEN and Ken-React CAPS L12/L were mixed in a suitable mixer such as a Henschel mixer. The composition was then extruded in a ZSK30 extruder with a two feeder system. The PEN pellets and the Ken-React CAPS L12/L were added into the extruder through one feeder. The two boron nitride was mixed and delivered through the other feeder. A nitrogen blanket was kept over the PEN feeder. The extruder heated the polymer pellet and high shear mixing with a screw speed of 350 rpm was used to provide a homogeneous melt. The extruder may include a plurality of heating zones having temperatures determined by the polyester and the coupling agent employed and the volume fraction of the fillers. For example, in this example the extruder had six zones set at about 543° F. After the material composition was extruded, it was passed through a die, pelletized and stored for molding. Testing bars were then injection molded via injection molding of the pelletized material composition in the temperature range of about 560–580° F.

Table 1 lists the properties of an injection molded testing bar at a thickness of ⅛ inches using the material composition described above.

TABLE 1

| Property | Unit | Value |
| --- | --- | --- |
| In-plane thermal conductivity | W/m° K. | 19.42 |
| In-plane coefficient of linear expansion | ppm/° C. | 7/1 |
| Surface resistivity | ohm/square | $10^{15}$ |
| Volume resistivity | ohm-cm | $10^{16}$ |
| Dielectric strength | KV/mil | >0.55 |
| Tensile strength | psi | 4500 |
| Young's modulus | psi | $3.1 \times 10^6$ |
| Flexural strength | psi | 7000 |
| Flexural modulus | psi | $2.83 \times 10^6$ |
| Flammability test | | |
| UL-94V (⅛" bars) | (V-scale) | V-0 |
| Oxygen index | (% Ox.) | 39.80 |

Other examples of PEN based material systems are listed in Table 2 below. These compositions were prepared as described above.

TABLE 2

Formulation and Properties of PEN Based Thermally Conductive Thermoplastic Composites

| Sample | PEN wt % | BN PT110 wt % | BN PT120 wt % | BN PT670 wt % | CAPSL-12/L wt % | K W/ m ° K. | CTE ppm/ ° C. |
| --- | --- | --- | --- | --- | --- | --- | --- |
| Example 2 | 20.5 | | 7.8 | 70.2 | 1.5 | 16.72 | 37.26 |
| Example 3 | 28.5 | 63.0 | 7.0 | | 1.5 | 19.42 | 4.0 |
| Example 4 | 22 | 70.20 | 7.8 | | 0 | 21.94 | 5.73 |
| Example 5 | 30 | | 7.0 | 63.0 | 0 | 6.9 | 13.51 |

Example 5 illustrates the importance of using a coupling agent in the compositions of the present invention.

Example 6—LCP Based Thermally Conductive Thermoplastic Composite

The following injection moldable composition was prepared using a ZSK30 extruder:

| Component | Sources | % Weight |
|---|---|---|
| Boron nitride powder (PT110) | Advanced Ceramic | 75.0 |
| Ken-React KR55 | Kenrich Petrochemical | 0.3 |
| Thermax LN001 | Eastman Chemical | 24.70 |

The sample was prepared as follows. The LCP polymer (Thermax LN100) was dried at Novatec at 300° F. for 6 hours. Boron nitride powder (PT110) was dried in forced air oven for 6 hours at 300° F. The forced air oven was cooled. The boron nitride was then put in autoclave bags and sealed. The sealed boron nitride was then put in the Novatec drying system and kept at about 120° F. until it was used. Thermax LN001 and PT110 were mixed in a Henschel mixer for one minute at 1800 rpm. While the Henschel was running, KR-55 was added using a syringe. The mixture was then mixed for one minute in the Henschel mixer at 1800 rpm and was then dumped into autoclave bag and tied. It was then put into the Novatec drier at 120° F. until it was to be extruded. The mix composition was extruded in a ZSK30 extruder with one feeder system. The extruder heated the polymer pellet and high shear mixing with a screw speed of 350 rpm to provide a homogeneous melt. The extruder may include a plurality of heating zones having temperatures determined by the LCP and the coupling agent employed and the volume fraction of the fillers. For example, in this example the extruder had 6 zones set at about 543° F. After the material composition was extruded, it was passed through a die, pelletized and stored for molding.

The above composition displayed the following properties when molded to obtain testing bars via injection molding of the pelletized material composition in the temperature range of about 625° F. to about 640° F.

| Property | Unit | Value |
|---|---|---|
| In-plane thermal conductivity | W/m° K. | 23.3 |
| In-plane coefficient of linear expansion | ppm/° C. | 7.1 |
| Tensile strength | psi | 5400 |
| Flexural strength | psi | 10350 |

Tables 3 and 4 list the formulations and properties of LCP based thermal composite prepared in accordance with the method described in Example 6.

TABLE 3

Liquid Crystal Polymer Based Formulations

| | Example 7 wt % | Example 8 wt % | Example 9 wt % | Example 10 wt % |
|---|---|---|---|---|
| Thermax LN001 | 21.923 | 24.7 | 24.54 | 21.923 |
| PT110 | 52.5 | 75 | 75 | 75 |
| PT120 | 22.5 | 0 | 0 | 0 |
| Ken-React L1CA12 | | | | |
| Ken-React KR55 | 0.3 | | | |
| CAPOW L12/H | 3.077 | | 0.46 | |
| CAPOW KR55/H | | | | 3.077 |
| Total | 100 | 100 | 100 | 100 |

TABLE 4

Liquid Crystal Polymer Based Formulations

| | Example 11 wt % | Example 12 wt % | Example 13 wt % | Example 14 wt % |
|---|---|---|---|---|
| Thermax LN001 | 24.54 | 24.7 | 23 | 23 |
| PT110 | 52.5 | 52.5 | 52.5 | 75 |
| PT120 | 22.5 | 22.5 | 22.5 | 0 |
| Ken-React L1CA12 | | 0.3 | | 2 |
| Ken-React KR55 | | | 2 | |
| CAPOW L12/H | | | | |
| CAPOW KR55/H | 0.46 | | | |
| Total | 100 | 100 | 100 | 100 |

Table 5 sets forth the properties of the composition of Examples 7–14.

TABLE 5

Properties of LCP Based Thermal Composites

| Example | K W/m° K. | CTE ppm/° C. | Density g/cc |
|---|---|---|---|
| 7 | 20.03 | 8.6 | 1.906 |
| 8 | 23.3 | 6.1 | 1.924 |
| 8 | 21.1 | 9.3 | 1.923 |
| 10 | 21.2 | 7.8 | 1.898 |
| 11 | 18.8 | 8.2 | 1.921 |
| 12 | 15.8 | 10.2 | 1.912 |
| 13 | 20.5 | 5.2 | 1.934 |
| 14 | 20.9 | 8.8 | 1.921 |

While the invention has been explained in relation to its preferred embodiments, it to be understood that various modifications thereof will become apparent to those skilled the art upon reading this specification. Therefore, it is to be understood that the invention disclosed herein is intended to cover such modifications as fall within the scope the appended claims.

What is claimed is:

1. A thermally conductive and moldable thermoplastic composition having a thermal conductivity of at least 15 W/m° K comprising a base thermoplastic resin, at least about 60% by weight boron nitride filler and a coupling agent, said base thermoplastic resin comprising a material having a tensile at yield of at least 10,000 psi selected from the group consisting of liquid crystal polymers and thermoplastic polyesters, and said boron nitride filler comprising from about 10% to about 40% by volume particles that display an average particle size of from about 5 to about 25 microns, from about 60% to about 90% by volume particles having an average particle size of from about 40 to about 80 microns, and in total particles having an average particle size of at least 50 microns.

2. The composition of claim 1 wherein said base thermoplastic resin comprises a liquid crystal polymer that displays a $T_m$ of at least about 250° C.

3. The composition of claim 1 wherein said base thermoplastic resin comprises a thermoplastic polyester that displays a $T_g$ of at least 100° C.

4. The composition of claim 1 wherein said composition displays a thermal conductivity of at least 18 W/m° K.

5. The composition of claim 1 wherein said composition displays a thermal conductivity of at least 20 W/m° K.

6. The composition of claim 1 wherein said composition displays a volume resistivity of at least about $10^{16}$ Ohm cm.

7. The composition of claim 1 wherein said base thermoplastic resin displays a melt processing temperature of from about 450° F. to about 600° F.

8. The composition of claim 1 wherein said boron nitride filler displays a hexagonal crystal structure.

9. The composition of claim 1 wherein said composition displays a flammability rating of V-O pursuant to UL-94 test procedures.

10. The composition of claim 1 wherein said thermoplastic base resin comprises from about 15% to about 40% by weight of said composition.

11. The composition of claim 1 wherein said boron nitride filler comprises at least about 65% by weight of said composition.

12. The composition of claim 1 wherein said boron nitride filler comprises at least about 70% by weight of said composition.

13. The composition of claim 1 wherein said coupling agent comprises from about 0.1% to about 5% by weight of said composition.

14. The composition of claim 3 wherein said base thermoplastic resin comprises polyethylene naphthalate.

* * * * *